United States Patent
Aldalaan et al.

(10) Patent No.: US 11,192,785 B2
(45) Date of Patent: Dec. 7, 2021

(54) PROCESS FOR SEPARATION OF HYDROGEN AND OXYGEN PRODUCED FROM PHOTOCATALYTIC WATER SPLITTING BY ABSORPTION

(71) Applicant: SABIC Global Technologies B.V., Bergen op Zoom (NL)

(72) Inventors: Nasser Ali Aldalaan, Riyadh (SA); Abdulaziz M. Al-Jodai, Riyadh (SA); Mubarik Ali Bashir, Riyadh (SA); Ashwin Ravi Sankar, Bengaluru (IN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 367 days.

(21) Appl. No.: 16/082,064

(22) PCT Filed: May 5, 2017

(86) PCT No.: PCT/IB2017/052641
§ 371 (c)(1),
(2) Date: Sep. 4, 2018

(87) PCT Pub. No.: WO2017/195083
PCT Pub. Date: Nov. 16, 2017

(65) Prior Publication Data
US 2020/0290871 A1    Sep. 17, 2020

Related U.S. Application Data

(60) Provisional application No. 62/335,382, filed on May 12, 2016.

(51) Int. Cl.
*C01B 3/52* (2006.01)
*B01D 53/14* (2006.01)
(Continued)

(52) U.S. Cl.
CPC ............ *C01B 3/52* (2013.01); *B01D 53/1425* (2013.01); *B01D 53/1431* (2013.01);
(Continued)

(58) Field of Classification Search
CPC ....... C01B 3/52; C01B 3/042; C01B 13/0285; C01B 2203/0475; C01B 2203/0465;
(Continued)

(56) References Cited

U.S. PATENT DOCUMENTS 2,047,550 A    7/1936 Dely
4,052,176 A    10/1977 Child et al.
(Continued)

FOREIGN PATENT DOCUMENTS

CN    102925916    2/2013
JP    201567478 A    4/2015

OTHER PUBLICATIONS

International Search Report and Written Opinion for PCT/IB2017/052641, dated Aug. 18, 2017.
(Continued)

*Primary Examiner* — Steven J Bos
*Assistant Examiner* — Syed T Iqbal
(74) *Attorney, Agent, or Firm* — Norton Rose Fulbright LLP

(57) ABSTRACT

Embodiments of the invention are directed to methods, processes, and systems for safely and reliably purifying hydrogen from a gas mixture containing hydrogen and oxygen.

16 Claims, 1 Drawing Sheet

(51) Int. Cl.
  *B01D 53/18* (2006.01)
  *C01B 3/04* (2006.01)
  *C01B 13/02* (2006.01)

(52) U.S. Cl.
  CPC .............. *B01D 53/18* (2013.01); *C01B 3/042* (2013.01); *C01B 13/0285* (2013.01); *B01D 2252/2021* (2013.01); *B01D 2252/2025* (2013.01); *B01D 2252/2026* (2013.01); *B01D 2252/20468* (2013.01); *C01B 2203/0475* (2013.01)

(58) Field of Classification Search
  CPC ........................ B01D 53/1425; B01D 53/1431; B01D 53/18; B01D 2252/2021; B01D 2252/2025; B01D 2252/2026; B01D 2252/20468; B01D 2252/205; B01D 2256/16; B01D 2257/104; B01D 53/14; Y02E 60/36
  See application file for complete search history.

(56) References Cited

U.S. PATENT DOCUMENTS

| | | | |
|---|---|---|---|
| 4,233,127 A | 11/1980 | Monahan | |
| 4,342,738 A | 8/1982 | Burgund | |
| 4,891,187 A | 1/1990 | Jungfer et al. | |
| 6,423,235 B1* | 7/2002 | Shimoi | B01D 19/0015 210/760 |
| 6,749,668 B2 | 6/2004 | Hofen et al. | |
| 7,785,550 B2 | 8/2010 | Hofmann et al. | |
| 2003/0010205 A1* | 1/2003 | Bikson | B01D 46/521 95/52 |
| 2008/0021665 A1 | 1/2008 | Vaughnn | |
| 2011/0296987 A1* | 12/2011 | Buhrman | B01D 45/16 95/34 |
| 2012/0267234 A1* | 10/2012 | Reece | B01J 35/004 204/157.5 |

OTHER PUBLICATIONS

Knist, Sascha "What are the opportunities to separate hydrogen from an oxyhydrogen gas mixture?" Accessed from the Internet on Aug. 15, 2018, URL: <https://www.researchgate.net/post/What_are_the_opportunities_to_separate_hydrogen_from_an_oxyhydrogen_gas_mixture>.

Roeb et al., "Solar Hydrogen Production by a Two-Step Cycle Based on Mixed Iron Oxides," *Journal of Solar Energy Engineering*, 2006, 128(2):125-133.

Scholes et al., "Membrane Gas Separation—Physical Solvent Absorption Combined Plant Simulations for Pre-combustion Capture," *Energy Procedia*, 2013, 37:1039-1049.

\* cited by examiner

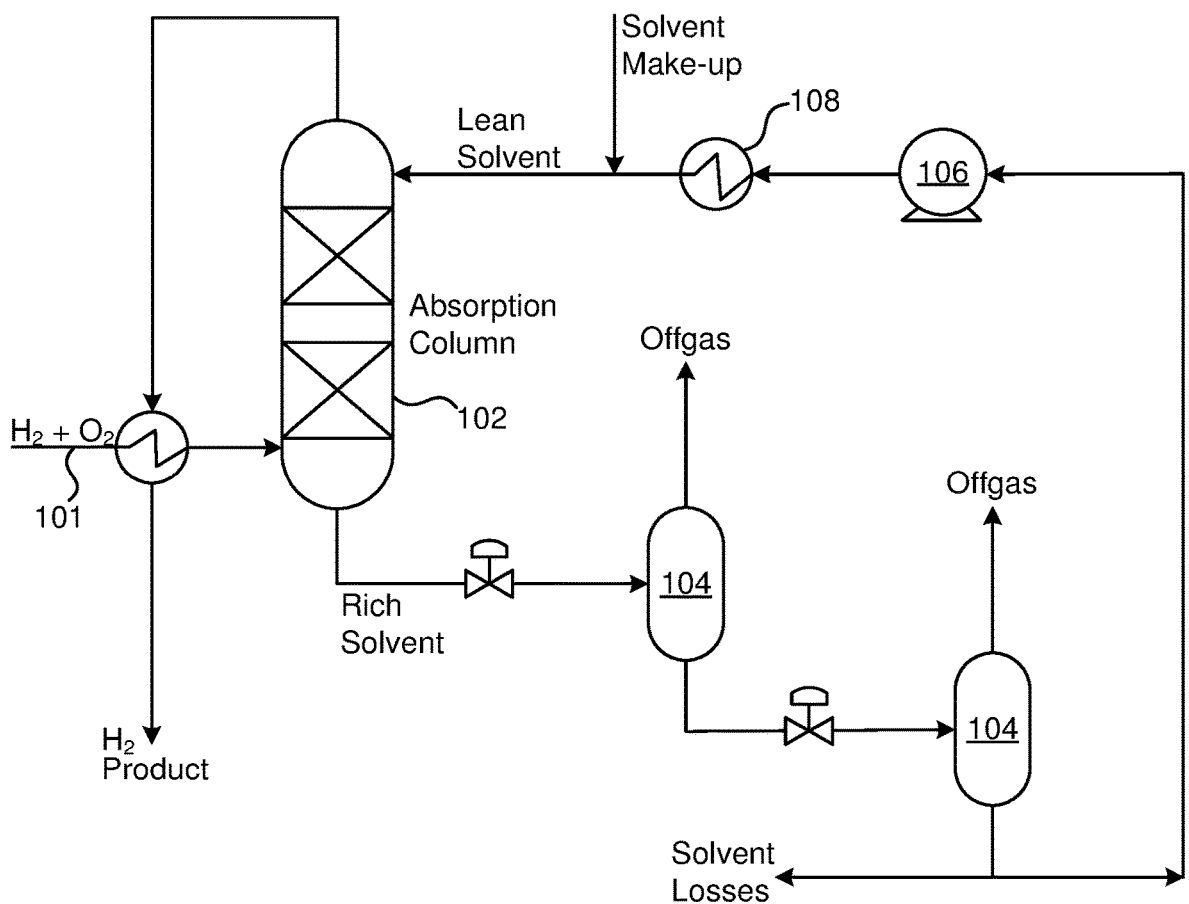

PROCESS FOR SEPARATION OF HYDROGEN AND OXYGEN PRODUCED FROM PHOTOCATALYTIC WATER SPLITTING BY ABSORPTION

CROSS-REFERENCE TO RELATED APPLICATIONS

This application is a national phase application under 35 U.S.C. § 371 of International Application No. PCT/IB2017/052641 filed May 5, 2017, which claims the benefit of priority of U.S. Provisional Patent Application No. 62/335,382 filed May 12, 2016. The entire contents of each of the above-referenced disclosures are specifically incorporated herein by reference.

BACKGROUND

Hydrogen fuel production has gained increased attention as oil and other nonrenewable fuels become increasingly depleted and expensive. Methods such as photocatalytic water-splitting are being investigated to produce hydrogen fuel, which burns cleanly, and can also be used in a hydrogen fuel cell. Water-splitting holds particular interest since it utilizes water, an inexpensive renewable resource.

Technologies are currently under development for producing energy from renewable and sustainable resources such as water. Water can be used as a feedstock for photocatalytic splitting using sun light to split water molecules into hydrogen and oxygen. The process produces a highly explosive gas mixture, which requires using as yet defined techniques and/or systems to separate and purify hydrogen from oxygen.

Various attempts to separate hydrogen from a product stream generated from a water-splitting reaction have been described. By way of example, U.S. Pat. No. 4,233,127 to Monahan describes collecting dissociated hydrogen and oxygen from a hot water splitting reaction (e.g., 2760° C. to 4150° C.), and separating the collected gases using a permeable membrane or a separator tank positioned as close to the reaction zone as possible to separate the gases at temperatures a high as possible to inhibit recombination of the gases.

While various methods to separate a gases mixture of hydrogen and water from a water-spitting reaction have been described, there remains a need for additional methods, processes, and systems for separating hydrogen from a highly flammable gaseous mixture containing hydrogen and oxygen.

SUMMARY

Embodiments of the current disclosure relate to methods, processes, and systems that provide solutions to the problems associated with purifying a gaseous mixture of hydrogen and oxygen produced by a photocatalytic water-splitting process. The solution provides safe and reliable methods for separating hydrogen from a highly flammable and explosive gas containing hydrogen and oxygen using solvent adsorption at atmospheric pressure.

Certain embodiments are directed to processes for separating hydrogen and oxygen from a gas mixture produced from photocatalytic splitting of water or other methods. A process can include: (a) compressing a feed source gas that includes oxygen and hydrogen to at least 1 MPa (10 bar) at ambient temperature; (b) pressurizing a solvent to at least 1 MPa at ambient temperature, wherein the solvent is capable of selectively adsorbing oxygen when under a pressure of at least 1 MPa (10 bar); (c) separating hydrogen and oxygen present in the feed source by solvent adsorption comprising, (i) passing the compressed solvent through an adsorption column at a pressure of at least 1 MPa; and (ii) passing the compressed feed source through an adsorption column at a pressure of at least 1 MPa counter to the pressurized solvent, the pressurized solvent selectively adsorbing oxygen from the feed source producing an enriched hydrogen product gas and an oxygen enriched solvent; and (iii) separating the hydrogen product gas and the oxygen enriched solvent; and (d) collecting, storing, or utilizing the hydrogen product gas. The process can further include (e) depressurizing the oxygen enriched solvent and desorbing the adsorbed oxygen from the solvent forming an oxygen off gas and regenerating the adsorption solvent; and (f) collecting, storing, or utilizing the oxygen off gas. In a further aspect, the process can also further include obtaining the feed source from a photocatalytic water-splitting reaction. In certain aspects, the feed source is approximately 70 mol. % hydrogen, 25 mol. % oxygen, and 5 mol. % carbon dioxide. In certain aspects, the solvent can be methanol, dimethyl ether of polyethylene glycol (DEPG), N-methyl-2-pyrrolidone (NMP), or propylene carbonate. The ambient temperature can be between 15, 20, 25, 30, 35 and 40, 45, 50, or 60° C., including all values and ranges there between. In a further aspect, the ambient temperature is between 15 and 60° C. The adsorption process can be performed at 0, 10, 20, 30 to 40, 50, 60, or 70° C., or any value or range there between. In certain aspects, the adsorption process can be performed at 0 to 60° C. In a further aspect, the adsorption process can be performed at about 20 to 40° C. The feed source gas can be compressed to about, at least, or at most 1.0, 2.0, 3.0 to 3.0, 4.0, 5.0 MPa. In certain aspects, the feed source gas can be compressed to about 2.0 MPa. In a further aspect, the feed source gas is compressed to about 3.0 MPa. The solvent can be compressed to about, at least, or at most 1.0, 2.0, 3.0 to 3.0, 4.0, 5.0 MPa. In certain aspects, the solvent is pressurized to about 2.0 MPa. In a further aspect, the solvent can be pressurized to about 3.0 MPa. The adsorption process can be performed at a pressure of about 1.0, 2.0, 3.0, to 3.0, 4.0, 5.0 MPa. In certain aspects, the adsorption process can be performed at a pressure of about 1.0 to 5.0 MPa. In a further aspect, the adsorption process is performed at a pressure of about 3.0 MPa. The desorption process can be performed at a pressure of about 0.05, 0.1, 0.2, or 0.4 MPa. In certain aspects, the desorption process can be performed at a pressure of about 0.1 MPa. The process can further include filtering and dehydrating the feed source prior to feeding the feed source gas to the adsorption column. In certain aspects, the process can be performed under conditions and using equipment to minimize spark generation. In a further aspect, the adsorption column is a packed column type adsorption column.

In certain aspects, the enriched hydrogen product gas can include at least 90, 95, 98, or up to 99 mol. % hydrogen.

Other embodiments are directed to a purified hydrogen stream produced by a process as described herein. In certain aspects, the purified hydrogen stream can include at least 90, 95, 98, or 99 mol. % hydrogen.

Still other embodiments are directed to a purified oxygen stream produced by a process as described herein. In certain aspects, the purified oxygen stream can include at least 30, 40, 50, or 60 mol. % oxygen.

Certain embodiments are directed to a gas purification system that can include: (a) an adsorption column configured to (i) receive a feed source gas in the lower half of the column so that the feed gas travels up the column, and (ii) receive a solvent in the upper half of the column so that the solvent travels down the column, wherein the solvent selectively adsorbs oxygen and exits the column as an oxygen enriched solvent and the feed source gas is processed while traversing the column and exits the top of the column as a hydrogen product gas; (b) a solvent reservoir or source configured to provide lean solvent to the adsorption column; and (c) a feed gas source configured to provide a feed source gas to the adsorption column. The system can further include a solvent regeneration unit configured to depressurize and deoxygenate a rich solvent exiting the adsorption column forming an oxygen off gas. The system can further include a hydrogen storage device to collect and store at least a portion of the enriched hydrogen stream. In certain aspects, the system further includes an oxygen storage device to collect and store at least a portion of the oxygen off gas.

The following includes definitions of various terms and phrases used throughout this specification.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The use of the term "or" in the claims is used to mean "and/or" unless explicitly indicated to refer to alternatives only or the alternatives are mutually exclusive, although the disclosure supports a definition that refers to only alternatives and "and/or."

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The processes, methods, and systems of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the processes, methods, and systems of the present invention are their ability to separate hydrogen from a highly flammability mixture of hydrogen and oxygen.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIG. 1. A block diagram of one embodiment of a hydrogen purification system disclosed herein of the present invention.

DESCRIPTION

A discovery has been found that provides a solution to handling highly flammable mixtures produced from water-splitting processes. The solution is premised on using a solvent adsorption process or system to separate hydrogen from a highly flammable and explosive gaseous mixture containing hydrogen and oxygen at ambient temperatures. The solution can provide a hydrogen stream that includes at least 95 mol % hydrogen. The combination of a solvent adsorption system with a photocatalytic water-splitting system provides the advantage of being able to separate a highly flammable mixture of oxygen and hydrogen generated from a photocatalytic water-splitting system.

These and other non-limiting aspects of the present invention are discussed in further detail in the following sections with reference to the FIG. 1. The systems and methods of described in FIG. 1 can also include various equipment that is not shown and is known to one of skill in the art of chemical processing. For example, some controllers, piping, computers, valves, pumps, heaters, thermocouples, pressure indicators may not be shown.

A. Photocatalytic Water-Splitting

Photocatalytic water-splitting is the light-induced conversion reaction of water to hydrogen and oxygen. This reaction has attracted attention as one of the most promising hydrogen production processes. Photocatalytic water-splitting is an artificial process for the dissociation of water into its constituent parts, hydrogen ($H_2$) and oxygen ($O_2$), using either artificial or natural light without producing greenhouse gases or having many adverse effects on the atmosphere. When $H_2O$ is split into $O_2$ and $H_2$, the stoichiometric ratio of its products is 2:1. The process of water-splitting is a highly endothermic process ($\Delta H>0$). Production of hydrogen from water requires large amounts of input energy, making it incompatible with existing energy generation.

There are several requirements for a photocatalyst to be useful for water-splitting. The minimum potential difference (voltage) needed to split water is 1.23 eV at 0 pH. Since the minimum band gap for successful water-splitting at pH=0 is 1.23 eV the electrochemical requirements can theoretically reach down into infrared light, albeit with negligible catalytic activity. These values are true only for a completely reversible reaction at standard temperature and pressure (1 bar and 25° C.). Theoretically, infrared light has enough energy to split water into hydrogen and oxygen; however, this reaction is kinetically very slow because the wavelength is greater than 380 nm. The potential must be less than 3.0 eV to make efficient use of the energy present across the full spectrum of sunlight. Water-splitting can transfer charges, but not be able to avoid corrosion for long term stability. Defects within crystalline photocatalysts can act as recombination sites, ultimately lowering efficiency.

Materials used in photocatalytic water-splitting fulfill the band requirements and typically have dopants and/or co-catalysts added to optimize their performance. A sample semiconductor with the proper band structure is titanium dioxide ($TiO_2$). However, due to the relatively positive conduction band of $TiO_2$, there is little driving force for $H_2$ production, so $TiO_2$ is typically used with a co-catalyst such as platinum (Pt) to increase the rate of $H_2$ production. It is routine to add co-catalysts to spur $H_2$ evolution in most photocatalysts due to the conduction band placement. Most semiconductors with suitable band structures to split water absorb mostly UV light; in order to absorb visible light, it is necessary to narrow the band gap.

Photocatalysts can suffer from catalyst decay and recombination under operating conditions. In certain aspects catalyst decay becomes a problem when using a sulfide-based photocatalyst such as cadmium sulfide (CdS), as the sulfide in the catalyst is oxidized to elemental sulfur at the same potentials used to split water. Thus, sulfide-based photocatalysts are not viable without sacrificial reagents such as sodium sulfide to replenish any sulfur lost, which effectively changes the main reaction to one of hydrogen evolution as opposed to water-splitting. Recombination of the electron-hole pairs needed for photocatalysis can occur with any catalyst and is dependent on the defects and surface area of the catalyst; thus, a high degree of crystallinity is required to avoid recombination at the defects. Non-limiting Examples of photocatalyst $NaTaO_3$:La—$NaTaO_3$:La, $K_3Ta_3B_2O_{12}$—$K_3Ta_3B_2O_{12}$, $(Ga_{0.82}Zn_{0.18})(N_{0.82}O_{0.18})$—$(Ga_{0.82}Zn_{0.18})(N_{0.82}O_{0.18})$, and $TiO_2$-based systems.

$NaTaO_3$:La—$NaTaO_3$:La yields the highest water-splitting rate of photocatalysts without using sacrificial reagents. This UV-based photocatalyst was shown to be highly effective with water-splitting rates of 9.7 mmol/h and a quantum yield of 56%. The nanostep structure of the material promotes water-splitting as edges functioned as $H_2$ production sites and the grooves functioned as $O_2$ production sites. Addition of NiO particles as co-catalysts assisted in $H_2$ production; this step can be done by using an impregnation method with an aqueous solution of $Ni(NO_3)_2 \cdot 6H_2O$ and evaporating the solution in the presence of the photocatalyst.

$K_3Ta_3B_2O_{12}$—$K_3Ta_3B_2O_{12}$ is activated by solely UV light and above, does not have the performance or quantum yield of $NaTaO_3$:La. However, it does have the ability to split water without the assistance of co-catalysts and gives a quantum yield of 6.5% along with a water-splitting rate of 1.21 mmol/h. This ability is due to the pillared structure of the photocatalyst, which involves $TaO_6$ pillars connected by $BO_3$ triangle units.

$(Ga_{0.82}Zn_{0.18})(N_{0.82}O_{0.18})$—$(Ga_{0.82}Zn_{0.18})(N_{0.82}O_{0.18})$ has one of the highest quantum yield in visible light for visible light-based photocatalysts that do not utilize sacrificial reagents. The photocatalyst gives a quantum yield of 5.9% along with a water-splitting rate of 0.4 mmol/h. Tuning the catalyst is done by increasing calcination temperatures for the final step in synthesizing the catalyst. Temperatures up to 600° C. helped to reduce the number of defects, though temperatures above 700° C. destroyed the local structure around zinc atoms and was thus undesirable.

$Pt/TiO_2$—$TiO_2$ is a very efficient photocatalyst, as it yields both a high quantum number and a high rate of $H_2$ gas evolution. For example, $Pt/TiO_2$ (anatase phase) is a catalyst used in water-splitting. These photocatalysts combine with a thin NaOH aqueous layer to make a solution that can split water into $H_2$ and $O_2$. $TiO_2$ absorbs only ultraviolet light due to its large band gap (>3.0 eV), but outperforms most visible light photocatalysts because it does not photocorrode as easily. Most ceramic materials have large band gaps and thus have stronger covalent bonds than other semiconductors with lower band gaps.

Cobalt based systems—Photocatalysts based on cobalt have been reported. Members are tris(bipyridine) cobalt(II), compounds of cobalt ligated to certain cyclic polyamines, and certain cobaloximes. Chromophores have reportedly been connected to part of a larger organic ring that surrounded a cobalt atom. The process is less efficient than using a platinum catalyst, cobalt is less expensive, potentially reducing total costs. The process uses one of two supramolecular assemblies based on Co(II)-templated coordination as photosensitizers and electron donors to a cobaloxime macrocycle.

B. Hydrogen Purification Using Solvent Adsorption

The gas produced from the photocatalytic water-splitting process is at near atmospheric pressure and it can contain about 70% mol $H_2$, 25% mol $O_2$ and 5% mol $CO_2$. This gas, is compressed to increase the pressure of the gas to the desired delivery pressure. The compressor, for example, is a piston compressor, a diaphragm compressor, a scroll compressor, or other type of compressor. In certain aspects, the gas is compressed using a piston compressor. In certain aspects, the gas is compressed to approximately 1 to 3 MPa (10 to 30 bar) and sent to a solvent adsorption separation unit for gas separation. For safety, the compressor should be a spark-free or spark-suppressed compressor.

Compressed gas can be used as a medium in numerous applications. Among various known techniques for compression of gas, piston compressors constitute a specific example of compression devices. A gas compressor is a mechanical device that increases the pressure of a gas by reducing its volume. In certain aspects, the compressor has an inlet and an outlet that are controlled by valves. At intake of gas into the cylinder, the inlet valve is opened and the outlet valve is closed. When the cylinder is filled with gas, the inlet is closed, while the outlet remains closed. The gas is then compressed to achieve an appropriate pressure and the outlet valve is opened through which the compressed gas is led. The compression cycle is repeated. Various compressor types can be used, such as diaphragm type compressors, which can be obtained through PDC Machines (Warminster, Pa.) or Howden & Sundyne (Arvada, Colo.) for example; or an ionic liquid filled compressor, which can be obtained from Linde (Pittston, Pa.) for example; or a labyrinth seal piston compressor, which can be obtained from Burckhardt Compression (Houston, Tex.) for example.

For the process described herein, the gas exiting the photochemical reactor is compressed to approximately 1.0 to 3.0 MPa before being passed through a feed/product exchanger and entering the bottom of the adsorption column.

The absorption column can be configured as a tray column, packed column, spray tower, bubble column, or a centrifugal contactor. In certain aspects, the gas mixture flows upward through a section of packing, contacting the solvent counter current, which enables the oxygen in the gas stream to dissolve into the solvent. The hydrogen rich gas stream exits the top. The solvent exits the column at the bottom, rich in oxygen, i.e., a rich solvent. The solvent can be depressurized regenerating the solvent and releasing a gaseous oxygen ($O_2$) stream (off gas). The oxygen dissolved in the solvent can be recovered. In order to maximize this recovery, recycling of the off gas may be needed.

After safely compressing the gas and producing the feed source, the feed source can be sent to a solvent adsorption separation unit. The processing chamber or column in the solvent adsorption separation unit can be designed to allow hydrogen gas to selectively pass through the chamber or column, exiting on the product gas side. The oxygen or other impurities are absorbed in the solvent, exiting as a rich solvent. The off gas produced by the solvent absorption separation unit contains mainly oxygen. In certain aspects, a small amount of inert gas can be added to reduce processing hazards.

In certain aspects, the hydrogen gas isolated by the solvent absorption separation unit can be further purified, if needed, by combustion. The hydrogen rich gas (product gas) can be compressed (e.g., to 3.0 MPa) and transmitted to a hydrogen purification unit. The hydrogen purification unit processes the hydrogen rich gas by combustion, which removes residual oxygen from the stream forming a purified stream. The purified stream is hot and can be used to raise medium pressure steam, while cooling the gas stream down to remove water.

Hydrogen has a wide flammability range in comparison with other fuels. As a result, hydrogen can be combusted over a wide range of gas mixtures. Thus, hydrogen can combust in a mixture in which the gas content is less than the theoretical, stoichiometric or chemically ideal amount needed for combustion. Hydrogen has very low ignition energy. The amount of energy needed to ignite hydrogen is about one order of magnitude less than that required for gasoline.

The potential for an explosive atmosphere during the processes disclosed herein will require the whole separation process to have zone 0 classification (minimizing spark generation). Pipework and membranes are made of a good electrical conducting polymer for the prevention of sparks.

FIG. 1 illustrates a flow diagram for one embodiment of the system. The solvent absorption column 102 separates and removes selected gases, particularly oxygen, using a solvent absorption process. FIG. 1 illustrates a scheme where reactants (e.g., water and sacrificial agent) and catalyst are processed in a reactor to produce a feed source stream 101 that includes a mixture of hydrogen and oxygen. The feed source 101 is compressed and transferred to bottom portion of absorption column 102. In absorption column 102, the feed source is exposed to a counter current solvent under pressure such that hydrogen passes without significant absorption by the pressurized solvent forming a hydrogen rich permeate gas, or product gas. The lean solvent is supplied into the absorption column 102, and absorbs oxygen from the feed source containing hydrogen. The processed feed source from which selected gases have been removed, is collected from the top of absorption column 102. After gas absorption, the rich solvent is discharged from the bottom portion of absorption column 102, and is regenerated by one or more depressurization units 104. The lean solvent can be pressurized by compressor 106, pass through heat exchanger 108, and be reintroduced to absorption column 102. The off gas, oxygen can be capture, stored, and utilized, or exhausted as needed.

Solvents found to be useful in the present invention are solvents that dissolve oxygen at increased pressures or under specific conditions and have a low hydrogen solubility at those same pressures or conditions. Examples of useful solvents include methanol, dimethyl ether of polyethylene glycol (DEPG), N-methyl-2-pyrrolidone (NMP), or propylene carbonate.

The FIGURE is included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The invention claimed is:

1. A process for separating hydrogen and oxygen from a gas mixture produced from photocatalytic splitting of water comprising:
   (a) compressing a feed source gas comprising oxygen and hydrogen to at least 1.0 MPa at ambient temperature;
   (b) pressurizing a solvent to at least 1.0 MPa at ambient temperature, wherein the solvent is capable of selectively adsorbing oxygen when under a pressure of at least 1.0 MPa;
   (c) separating hydrogen and oxygen present in the feed source by solvent adsorption comprising,
      (i) passing the compressed solvent through an adsorption column at a pressure of at least 1.0 MPa; and
      (ii) passing the compressed feed source gas through an adsorption column at a pressure of at least 1.0 MPa counter to the pressurized solvent, the pressurized solvent selectively adsorbing oxygen from the feed source gas producing an enriched hydrogen product gas and an oxygen enriched solvent; and
      (iii) separating the hydrogen product gas and the oxygen enriched solvent;
   (d) collecting, storing, or exhausting the hydrogen product gas; and
   (e) filtering and dehydrating the feed source gas prior to feeding the feed source gas to the adsorption column;
   wherein the solvent is dimethyl ether of polyethylene glycol.

2. The process of claim 1, further comprising:
   (f) depressurizing the oxygen enriched solvent and desorbing the adsorbed oxygen from the solvent, forming an oxygen off gas and regenerating the adsorption solvent; and
   (g) collecting or storing the oxygen off gas.

3. The process of claim 1, further comprising obtaining the feed source gas from a photocatalytic water-splitting reaction.

4. The process of claim 1, wherein the feed source gas is approximately 70 mol % hydrogen, 25 mol % oxygen, and 5 mol % carbon dioxide.

5. The process of claim 1, wherein ambient temperature is 15° C.

6. The process of claim 5, wherein the adsorption process of step (c)(ii) is performed at a pressure of about 1.0 MPa.

7. The process of claim 4, wherein the adsorption process of step (c)(ii) is performed at a pressure of about 1.0 MPa.

8. The process of claim 1, wherein the solvent is pressurized to about 2.0 to 3.0 MPa.

9. The process of claim 5, wherein the adsorption process of step (c)(ii) is performed at a pressure of about 1.0 MPa.

10. The process of claim 1, wherein the adsorption process of step (c)(ii) is performed at a pressure of about 3.0 MPa.

11. The process of claim 2, wherein the desorption process is performed at a pressure of about 1 bar.

12. The process of claim 1, further comprising filtering and dehydrating the feed source gas prior to feeding the feed source gas to the adsorption column.

13. The process of claim 1, wherein the enriched hydrogen product gas comprises at least 95 mol % hydrogen.

14. The process of claim 1, wherein the process is performed under conditions and using equipment to minimize spark generation.

15. The process of claim 1, wherein the adsorption column is a packed column type adsorption column.

16. A process for separating hydrogen and oxygen from a gas mixture produced from photocatalytic splitting of water comprising:
   (a) compressing a feed source gas comprising oxygen and hydrogen to at least 1.0 MPa at ambient temperature;
   (b) pressurizing a solvent to at least 1.0 MPa at ambient temperature, wherein the solvent is capable of selectively adsorbing oxygen when under a pressure of at least 1.0 MPa;
   (c) separating hydrogen and oxygen present in the feed source by solvent adsorption comprising,
      (i) passing the compressed solvent through an adsorption column at a pressure of at least 1.0 MPa; and
      (ii) passing the compressed feed source gas through an adsorption column at a pressure of at least 1.0 MPa counter to the pressurized solvent, the pressurized solvent selectively adsorbing oxygen from the feed source gas producing an enriched hydrogen product gas and an oxygen enriched solvent; and
      (iii) separating the hydrogen product gas and the oxygen enriched solvent;
   (d) collecting or storing the hydrogen product gas;
   (e) filtering and dehydrating the feed source gas prior to feeding the feed source gas to the adsorption column;
   (f) depressurizing the oxygen enriched solvent and desorbing the adsorbed oxygen from the solvent, forming an oxygen off gas and regenerating the adsorption solvent;
   (g) collecting the oxygen off gas; and
   (h) obtaining the feed source gas from a photocatalytic water-splitting reaction;
wherein the feed source gas consists of 70 mol % hydrogen, 25 mol % oxygen, and 5 mol % carbon dioxide; wherein the solvent is a dimethyl ether of polyethylene glycol;
wherein ambient temperature is 15° C.; and
wherein the adsorption process of step (c)(ii) is performed at a pressure of about 1.0° C.; wherein the adsorption process of step (c)(ii) is performed at a pressure of about 1.0 MPa.

* * * * *

UNITED STATES PATENT AND TRADEMARK OFFICE
CERTIFICATE OF CORRECTION

PATENT NO. : 11,192,785 B2
APPLICATION NO. : 16/082064
DATED : December 7, 2021
INVENTOR(S) : Nasser Ali Aldalaan et al.

It is certified that error appears in the above-identified patent and that said Letters Patent is hereby corrected as shown below:

In the Claims

At Column 8, Claim number 6, delete "5" and replace with --1--.

Signed and Sealed this
Fifth Day of July, 2022

Katherine Kelly Vidal
*Director of the United States Patent and Trademark Office*